United States Patent [19]
Wrobleski et al.

[11] Patent Number: 4,617,855
[45] Date of Patent: Oct. 21, 1986

[54] HYDRAULIC SLAVE CYLINDER SWITCH

[75] Inventors: David L. Wrobleski, Fraser; David K. Mienko, Clawson; Keith V. Leigh-Monstevens, Troy, all of Mich.

[73] Assignee: Automotive Products plc, Warwickshire, England

[21] Appl. No.: 641,055

[22] Filed: Aug. 15, 1984

[51] Int. Cl.⁴ .............................................. F01B 31/12
[52] U.S. Cl. ...................................... 92/5 R; 60/534; 60/545; 180/272; 192/0.084; 192/0.096; 200/82 R; 200/83 S
[58] Field of Search ................ 60/534, 545; 91/1; 92/5 R; 180/271, 272; 192/0.084, 0.096; 200/82 R, 82 DA, 82 D, 83 S, 83 SA

[56] References Cited

U.S. PATENT DOCUMENTS

| | | | |
|---|---|---|---|
| 1,964,155 | 6/1934 | Hobbs | 200/82 DA |
| 2,239,348 | 4/1941 | Wirtanen et al. | 92/5 R |
| 2,659,018 | 11/1953 | Harrison | 200/82 DA |
| 2,859,296 | 11/1958 | Neu | 200/82 D |
| 2,949,105 | 8/1900 | Davis | 200/82 DA |
| 3,406,800 | 10/1968 | Buchanan et al. | 200/82 R |
| 4,033,311 | 7/1977 | Burson | 180/271 |
| 4,140,045 | 2/1979 | Hardwick et al. | 92/5 R |
| 4,417,236 | 11/1983 | Hung | 92/5 R |
| 4,446,614 | 5/1984 | Haag | 200/83 SA |

FOREIGN PATENT DOCUMENTS 2102906 2/1983 United Kingdom .
2124321 2/1984 United Kingdom .

Primary Examiner—Robert E. Garrett
Assistant Examiner—Richard S. Meyer
Attorney, Agent, or Firm—Hauke & Patalidis

[57] ABSTRACT

An interlock switch mounted in the end of a hydraulic slave cylinder adapted to operate the release mechanism of a motor vehicle mechanical clutch, the slave cylinder being hydraulically connected to a master cylinder having an input member operable by the motor vehicle clutch pedal. The switch is adapted to close the motor vehicle starter relay circuit for a position of the slave cylinder output member corresponding to full release of the clutch, such that the clutch must be fully released in order to allow starting the motor vehicle engine. Preferably, the switch takes the form of a pair of concentric sleeves, each carrying appropriate contacts for closing the circuit, one of the sleeves being reciprocable in unison with the slave cylinder output member, and the other sleeve being automatically adjustable for initial position adjustment and for subsequent readjustment to compensate for wear of the clutch, such that closure of the switch always corresponds to a full release of the motor vehicle clutch.

32 Claims, 5 Drawing Figures

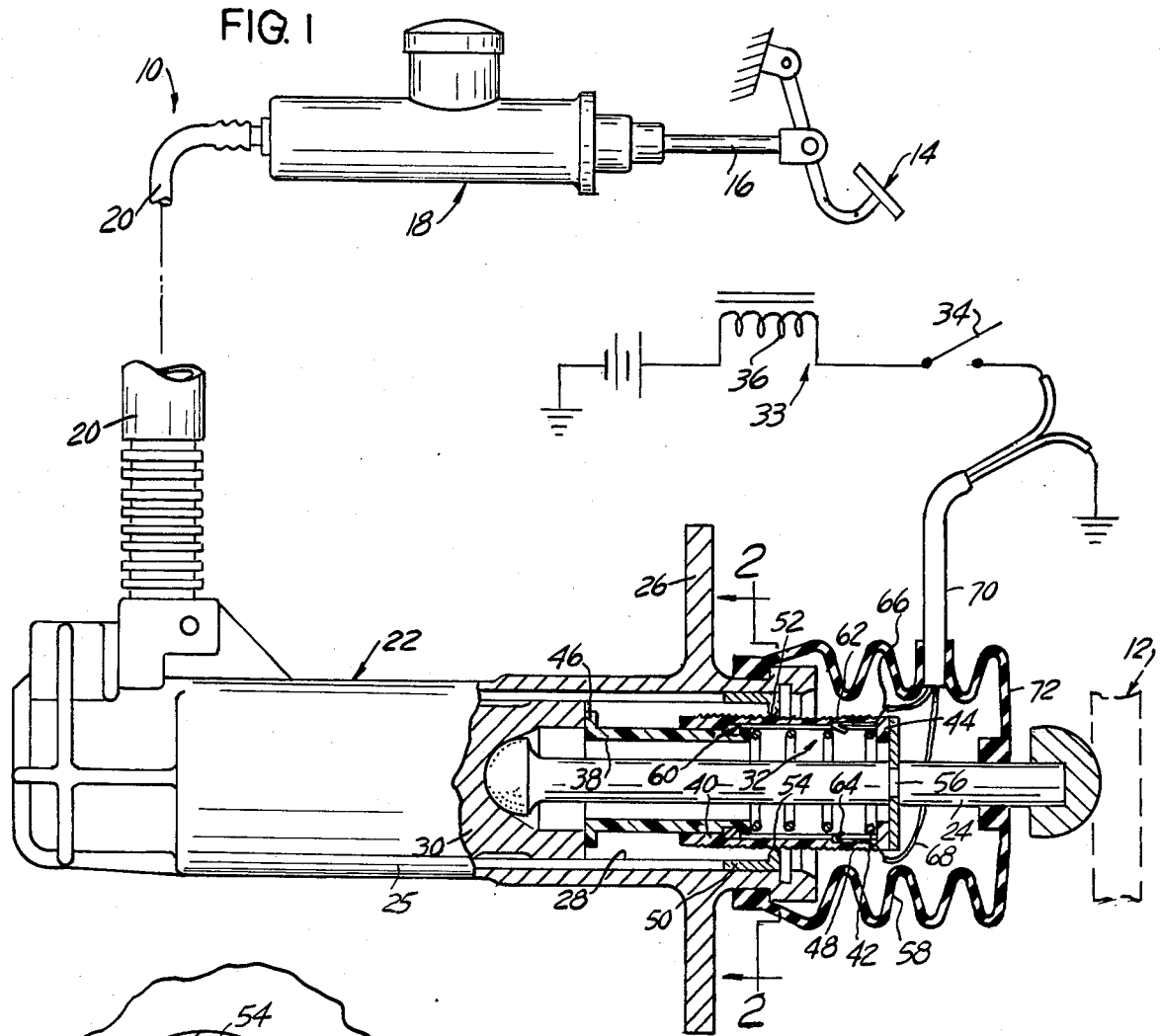
FIG. 1
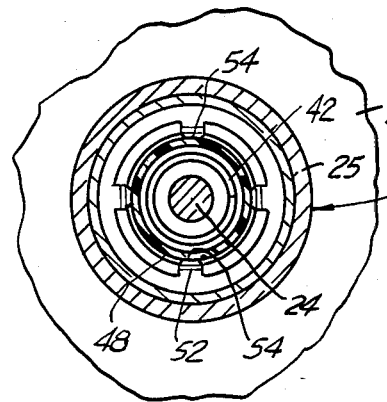
FIG. 2
FIG. 3

HYDRAULIC SLAVE CYLINDER SWITCH

BACKGROUND OF THE INVENTION

The present application relates to an electrical switch operated by the output member of a hydraulic slave cylinder, such as the slave cylinder of a motor vehicle clutch hydraulic control system.

Hydraulic control apparatus for motor vehicle mechanical clutches are in wide use at the present for operating the clutch release mechanism of a motor vehicle provided with a mechanical clutch and a conventional manually shiftable transmission or gearbox. Examples of such hydraulic control systems for mechanical clutches are disclosed in U.S. Pat. Nos. 4,407,125 and 4,454,632, and in copending application Ser. Nos. 371,958 now abandoned, 376,248, 477,161 now U.S. Pat. No. 4,585,108, 477,162 now U.S. Pat. No. 4,585,109, 477,159 now U.S. Pat. No. 4,585,106, 477,160 now U.S. Pat. No. 4,585,107, 537,869, 555,667, 555,666, 555,668, all assigned to the same assignee as the present application.

It has become general practice in the automobile industry to interlock the operation of a motor vehicle engine starter motor with other controls such that the starter motor is rendered inoperative unless the transmission is in neutral or park, in motor vehicles provided with an automatic transmission or, in motor vehicles provided with a foot operated clutch and a manually operated gear shift transmission, unless the transmission is in neutral and/or the clutch pedal is fully depressed.

In application Ser. No. 590,168, filed Mar. 16, 1984 for Hydraulic Master Cylinder Switch, master cylinder switches are disclosed that close an electrical circuit when the clutch pedal is fully depressed thus resulting in the master cylinder input member being fully retracted. Under normal operative conditions, fully depressing the clutch pedal results in transferring hydraulic fluid from the master cylinder to the slave cylinder operating the clutch release mechanism. Therefore, under normal operative conditions, full depression of the clutch pedal results in full release of the mechanical clutch, and such an arrangement, consisting in having the starter motor relay interlock circuit enabled as a result of the clutch pedal being fully depressed, has been found to be fully satisfactory unless the conduit interconnecting the master cylinder and the slave cylinder has been accidentally ruptured, or loss of hydraulic fluid has otherwise occurred, or the slave cylinder, for some other reasons, has become inoperative. Under such abnormal operative conditions, the clutch pedal may be fully depressed although the mechanical clutch could remain engaged.

Total loss of hydraulic fluid in a motor vehicle clutch control hydraulic apparatus may be detected by placing a level sensor in the hydraulic fluid reservoir associated with the master cylinder. Total or substantial loss of hydraulic fluid results in the level sensor providing a visual and/or audio indication to the driver or, in the alternative, the level sensor may be part of the starting motor relay circuit, functioning as an interlock switch. However, low hydraulic fluid level in the master cylinder reservoir does not necessarily indicate that the clutch hydraulic control apparatus is non-operative. Under conditions of low hydraulic fluid level in the reservoir, sufficient hydraulic fluid may be present in the system to maintain the apparatus in an operative condition.

It is therefore desirable to provide an interlock switch whose function is controlled by the clutch release slave cylinder, rather than by the master cylinder and which, for example, is actuated either directly by the hydraulic fluid pressure in the working chamber of the slave cylinder or by the reaction load upon the slave cylinder output member on actuation of the clutch from fully engaged to fully released, as disclosed in application Ser. No. 641,056 now allowed, filed contemporaneously herewith. Alternatively, the interlock switch may be such as to be closed as a result to a full stroke of the slave cylinder output member required for releasing the clutch which, in turn, requires that the switch be operated at a predetermined position of the output member corresponding to such full release of the mechanical clutch.

One advantage of hydraulic control apparatus for motor vehicle mechanical clutches is that they automatically compensate for progressive wear of the clutch friction linings. In a diaphragm spring disk clutch, for example, as the disk friction lining wears the ends of the diaphragm fingers move outwardly, therefore pushing back the throw-out bearing. The wear of the disk friction lining is automatically compensated for as a result of the slave cylinder pushrod being progressively caused to retract further within the cylinder upon full engagement of the clutch under the action of the diaphragm spring force, thus causing in turn a progressive decrease of the volume of the working chamber of the slave cylinder, with the excess hydraulic fluid being progressively returned to the master cylinder and from the master cylinder to the hydraulic fluid reservoir. Therefore, a fixed position limit switch associated with the slave cylinder requires constant adjustment of the member causing closure of the switch upon full release of the clutch, in order to provide a foolproof arrangement.

SUMMARY OF THE INVENTION

The present invention provides an interlock switch associated with a motor vehicle clutch hydraulic control apparatus enabling the starter relay circuit of the electric motor starting the internal combustion engine of the motor vehicle engine only when the clutch is released. The present invention provides such a switch forming part of the hydraulic slave cylinder actuatable by hydraulic fluid displace an output member to a position fully releasing the clutch, and capable of automatically compensating for progressive change of such position in one direction as the clutch lining progressively wears.

The many objects and advantages of the present invention will become apparent to those skilled in the art when the following description of the best modes contemplated, at the present, for practicing the invention are read in conjunction with the accompanying drawing wherein like reference numerals refer to like or equivalent parts and in which:

BRIEF DESCRIPTION OF THE DRAWING

FIG. 1 is a schematic illustration of a hydraulic apparatus according to the present invention provided with an interlock limit switch operated by the displacement of the slave cylinder output member operating a clutch release mechanism;

FIG. 2 is a section thereof along line 2—2 of FIG. 1;

FIG. 3 is a partial view similar to FIG. 1 but showing the relative position of the diverse components upon full release of the clutch;

DETAILED DESCRIPTION OF THE PREFERRED EMBODIMENT

Figure 4:
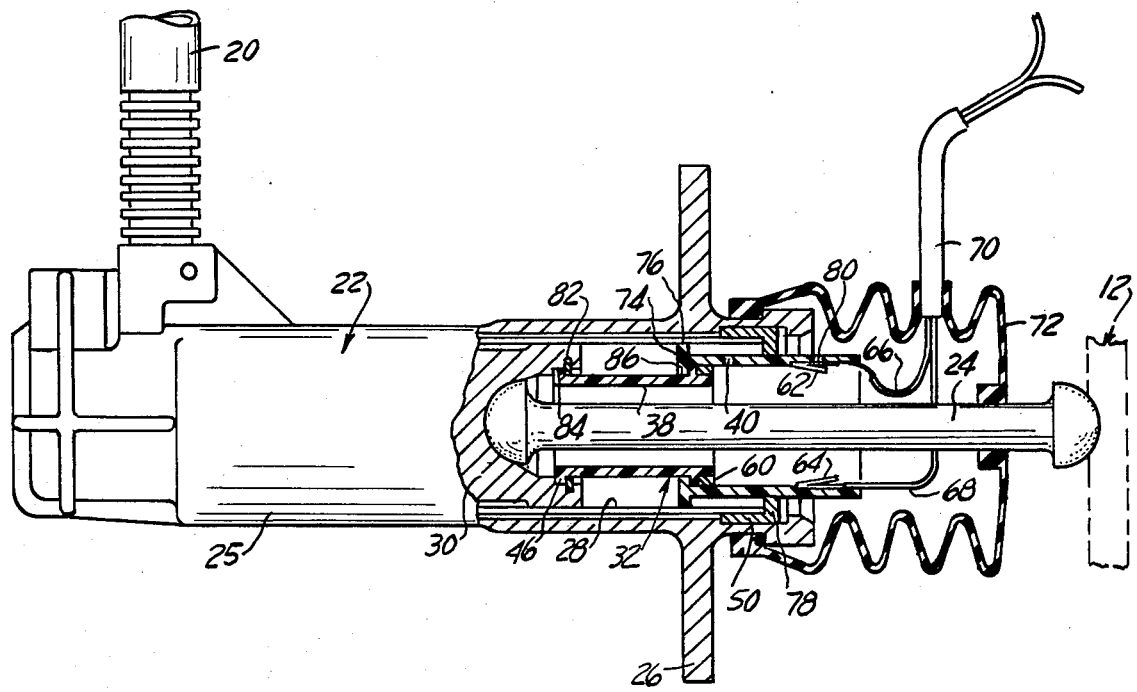
FIG. 4 is a partial view similar to FIG. 1 but showing a modification thereof.

Referring to the drawing, and more particularly to FIG. 1, there is illustrated a hydraulic apparatus 10 for the remote operation of a clutch release mechanism 12 from a clutch control pedal 14 installed, in the usual position and manner, in the driver compartment of a motor vehicle, not shown. The clutch control pedal 14 is adapted to actuate the input rod 16 of a master cylinder 18 connected, via a conduit 20, to a slave cylinder 22. Inward displacement of the master cylinder input rod 16 causes a corresponding outward displacement of the slave cylinder output member, or pushrod, 24, the end of the pushrod 24 engaging the clutch release mechanism 12. The housing 25 of the slave cylinder 22 is provided with a mounting flange 26, or other mounting means, for affixing the slave cylinder 22 in an appropriate location through an opening in the clutch bell housing, not shown.

The slave cylinder housing 25 has a cylindrical bore 28 in which is reciprocably disposed a piston 30 and, when hydraulic fluid displaced from the master cylinder 18 is introduced, via the conduit 20, into the slave cylinder bore 28 on one side of the piston 30, the flow of hydraulic fluid into the slave cylinder 22 causes the piston 30, and consequently the output member or pushrod 24 displaced thereby, to travel from the position indicated at FIG. 1 to the position indicated at FIG. 3.

A switch, generally designated at 32, is mounted in the bore 28 of the slave cylinder 22, generally surrounding the pushrod 24. The switch 32 is connected in series in the relay circuit 33 of the engine starter motor and is normally open in the position of the piston 30 and pushrod 24 illustrated at FIG. 1, and closed only for the position of the piston 30 and pushrod 24 illustrated at FIG. 3. As long as the switch 32 is open, the engine starter motor relay circuit 33 is also open, and closing the starter relay switch 34, FIG. 1, has no action upon the motor vehicle engine starter relay 36. However, when the switch 32 is closed, as a result of the slave cylinder pushrod 24 having been displaced to the position releasing the clutch via the clutch release mechanism 12, FIG. 3, the switch 32 is closed and the circuit 33 of the starter relay 36 is enabled as soon as the starter switch 34 is closed.

The switch 32 comprises a pair of telescopic sleeves 38 and 40 slidably disposed mutually concentric, the sleeve 38 being positioned within the sleeve 40. A compressed relatively weak coil spring 42 is located between the end of the inner sleeve 38 extending within an end of the outer sleeve 40 and an inwardly directed flange 44 formed at the other end of the outer sleeve 40, such as to urge the inner sleeve 38 to extend from the outer sleeve 40. The free end of the inner sleeve 38 has an outwardly radially extending flange 46 engaged with the corresponding end of the piston 30, the compressed coil spring 42 constantly engaging the inner sleeve flange 46 with the end of the piston 30. The outer sleeve 40 is provided on its peripheral surface with a plurality of parallel fine shallow grooves 48, forming a ratchet-like mounting of the outer sleeve 40 at the end of the housing 25 of the slave cylinder 22 in co-operation with a holding ring 50 affixed to the end of the bore 28 and provided with a plurality of radially and inwardly extending resilient fingers 52 having a sharp tip 54 engaged in one of the grooves 48. The slave cylinder pushrod 24 is provided with a peripheral groove 56 in which is installed a split ring 58 defining a shoulder abutment for engagement with the end flange 44 of the switch outer sleeve 40. The inner sleeve 38 which, preferably, is made of plastic, carries a current conductive metallic contact ring 60 proximate to or at its end projecting within the outer sleeve 40, and the outer sleeve 40, which is made of dielectric material, is provided with a pair of spring contacts 62 and 64. The contact 62 is connected to an electric wire 66, and the contact 64 is connected to the other electric wire 68 of a cable 70 passed through an elastomeric boot 72 mounted on the end of the slave cylinder 22. The starter motor relay circuit 33 is consequently enabled when the switch 32 is closed as a result of the contact ring 60 engaging and bridging the spring contacts 62 and 64 when the slave cylinder pushrod 24 is fully extended, FIG. 3, and the circuit is opened when the slave cylinder pushrod 24 is retracted, thus allowing the inner sleeve 38 to extend from the outer sleeve 40 as a result of the inner sleeve abutment flange 46 being urged in engagement with the end of the piston 30 by the compressed coil spring 42.

The structure of the switch 32 provides automatic initial setting of the linear position of the switch and automatic compensation for clutch lining wear. The linear dimensions of the switch inner sleeve 38 and outer sleeve 40, the location of the contact ring 60 on the periphery of the inner sleeve 38 and the location of the spring contacts 62 and 64 on the interior of the outer sleeve 40 are predetermined as a function of the stroke of the piston 30 and slave cylinder pushrod 24 from full engagement of the clutch to full disengagement of the clutch, FIGS. 1 and 3. The switch 32 needs not be installed at the end of the housing 25 in any preset accurate position. If it is installed projecting farther than required into the housing bore 28, upon first actuation of the slave cylinder 22 the outwardly extending radial flange 46 of the switch inner sleeve 38 engages the corresponding end of the outer sleeve 40, thereby displacing the outer sleeve 40 outwardly from the end of the slave cylinder housing 25 to an appropriate position for closure of the switch upon full release of the clutch. If the sleeve 32 is initially installed such as to project from the end of the housing 25 farther than required during assembly of the slave cylinder 22, once the slave cylinder 22 is installed in a motor vehicle in its functioning position, the end of the pushrod 24 engaging the clutch release mechanism 12, upon return of the pushrod 24 to its home position, or position corresponding to full engagement of the clutch, the outer sleeve 40 of the switch 32 is forced to an appropriate position as a result of engagement of the abutment ring 58 on the pushrod 24 with the end flange 44 of the outer sleeve 40. The outer sleeve 40 is displaceable in both directions relative to the holding ring 50, which is held in a fixed position, due to the ratchet-like structure formed by the combination of the peripheral grooves 48 on the sleeve 40 and of the resilient fingers 52 of the holding ring 50 which enables the tip 54 of each finger 52 to jump from one groove 48 to the next consecutive groove when a push is exerted on the outer sleeve 40 on one end of the sleeve or the other.

It will be readily appreciated by those skilled in the art that the switch 32 automatically compensates for wear of the clutch disk friction linings. Wear of the clutch disk linings causes the ends of the clutch spring diaphragm fingers to be progressively positioned farther outwardly when the clutch is fully engaged, thus in turn causing the clutch release mechanism 12 which, in most common structures, is the end of an arm connected to, or forming part of, the clutch control fork to progressively return to a home position displaced in the direction further corresponding to a fully engaged clutch. Generally, in hydraulic clutch control apparatus of the type herein illustrated, the fully engaged clutch home position progressively causes the output member or pushrod 24 of the slave cylinder 21 to be progressively returned to a more retracted position corresponding to full engagement of the clutch. In the structure illustrated, this in turn causes the abutment ring 58, as a result of engagement with the end flange 44 of the switch outer sleeve 40, to progressively readjust the outer sleeve 40 to a proper position.

Figure 5:
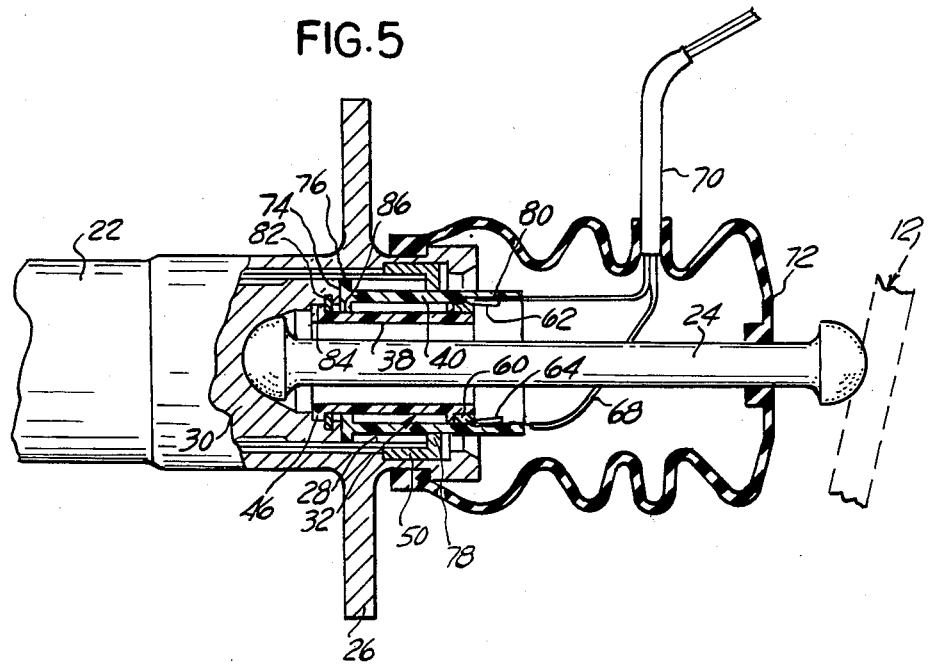
FIG. 5 is a partial view similar to FIG. 3 but showing the operation of the arrangement of FIG. 4.

In the structure depicted at FIGS. 4–5, the switch 32 mounted in the end of the slave cylinder bore 28 also comprises an inner sleeve 38 provided at one end with an electrically conductive bridging contact ring 60, and an outer sleeve 40 provided with a pair of spring contacts 62 and 64 for closing a circuit through the wires 66 and 68. The outer sleeve 40 is frictionally held within the bore 28 as a result of being provided at its end in which telescopes the inner sleeve 38 with an annular flange 74 having an outer edge 76 in frictional engagement with the internal surface of the cylinder bore 28. The switch-holding ring 50 has an inwardly directed radial flange 78 frictionally engaged at its edge 80 with the peripheral surface of the outer sleeve 40. The inner sleeve 38 is attached at one end to the piston 30 by any convenient means such as a split-ring 82 disposed in a corresponding inner groove in a cylindrical recess 84 formed at the end of the piston 30 and in which is engaged the flange 46 at the end of the sleeve 38, the flange 46 abutting against the bottom of the piston recess 84. The other end of the inner sleeve 38 has a shoulder annular abutment 86 capable of engagement below the annular flange 78 of the outer sleeve 40.

Initial positional setting of the switch 32 of FIGS. 4–5 is effected upon first operation of the slave cylinder 22, FIG. 5, upon engagement of the end of the piston 30 with the outer sleeve annular flange 74, thus causing displacement of the switch outer sleeve 40 to the appropriate position whereby the contacts 62 and 64 are closed through the contact ring 60 on the inner sleeve 38. The outer sleeve 40 is frictionally held in its thus set position. Clutch wear compensation, and correct positioning of the switch 32 corresponding to fully engaged clutch, is automatically effected by the annular shoulder 86 of the switch inner sleeve 38 engaging below the annular flange 74 of the outer sleeve 40, thereby displacing the outer sleeve 40 to the correct position wherein it is frictionally held.

It will be readily appreciated by those skilled in the art that the examples of structure herein illustrated and described in detail have been given for illustrative purpose only and that many modifications of such specific structures fall within the scope of the appended claims. For example, the switch inner sleeve 38 may be coupled to the cylinder pushrod 24 by way of transverse pins or by way of abutting shoulder surfaces, such as to be linearly displaceable directly by the pushrod 24, rather than being coupled to the piston 30 or arranged such as to be linearly displaceable by the piston. The cylinder output member operating the switch 32 and automatically adjusting the linear position of the switch is, in all cases, any one of two elements, the piston 30 or the pushrod 24 which, in combination, define the cylinder output member.

Having thus described the present invention by way of an example of structure thereof well designed for accomplishing the objects of the invention, modification whereof will be apparent to those skilled in the art, what is claimed as new is as follows:

1. In combination with a hydraulic cylinder having a linearly displaceable member, an electrical switch extending into said cylinder and operable by said member during displacement of said member for a home position to an operative position said electrical switch having stationary contact means and movable contact means displaceable by said member when displaced from said home position wherein said movable contact means is displaced to said operative position causing engagement of said movable contact means with said stationary contact means, and automatic adjustment means for adjusting the position of said stationary contact means by said member upon return of said member to said home position.

2. The electrical switch of claim 1 further comprising second automatic adjustment means for adjusting the position of said stationary contact means by said member upon said member reaching said operative position.

3. The electrical switch of claim 1 wherein said cylinder is a hydraulic clutch control slave cylinder and wherein engagement of said movable contact means with said stationary contact means enables an engine starter motor relay circuit.

4. The electrical switch of claim 2 wherein said cylinder is a hydraulic clutch control slave cylinder and wherein engagement of said movable contact means with said stationary contact means enables an engine starter motor relay circuit.

5. The electrical switch of claim 1 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

6. The electrical switch of claim 2 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

7. The electrical switch of claim 3 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

8. The electrical switch of claim 4 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

9. The electrical switch of claim 5 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon return of said member to its home position.

10. The electrical switch of claim 6 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon return of said member to its home position.

11. The electrical switch of claim 7 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon return of said member to its home position.

12. The electrical switch of claim 8 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon return of said member to its home position.

13. The electrical switch of claim 5 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

14. The electrical switch of claim 6 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

15. The electrical switch of claim 7 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

16. The electrical switch of claim 8 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

17. In combination with a hydraulic cylinder having a linearly displaceable member, an electrical switch into said cylinder and operable by said member during displacement of said member from a home position to an operative position, said electrical switch having stationary contact means and movable contact means displaceable by said member when displaced from said home position wherein said movable contact means is displaced to said operative position causing engagement of said movable contact means with said stationary contact means, and automatic adjustment means for adjusting the position of said stationary contact means by said member upon said member reaching said operative position.

18. The electrical switch of claim 17 further comprising second automatic adjustment means for adjusting the position of said stationary contact means by said member upon return of said member to said home position.

19. The electrical switch of claim 17 wherein said cylinder is a hydraulic clutch control slave cylinder and wherein engagement of said movable contact means with said stationary contact means enables an engine starter motor relay circuit.

20. The electrical switch of claim 18 wherein said cylinder is a hydraulic clutch control slave cylinder and wherein engagement of said movable contact means with said stationary contact means enables an engine starter motor relay circuit.

21. The electrical switch of claim 17 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

22. The electrical switch of claim 18 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

23. The electrical switch of claim 19 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

24. The electrical switch of claim 20 wherein said switch takes the form of a pair of coaxially disposed sleeves, one of said sleeves supporting said movable contact means and being mechanically connected to said member for displacement therewith, the other of said sleeves supporting said stationary contact means, and means adjustably holding the other of said sleeves in said cylinder.

25. The electrical switch of claim 21 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon said member reaching said operative position.

26. The electrical switch of claim 22 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon said member reaching said operative position.

27. The electrical switch of claim 23 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon said member reaching said operative position.

28. The electrical switch of claim 24 wherein the other of said sleeves which is adjustably held in said cylinder is frictionally held in said cylinder, and wherein said automatic adjustment means comprises abutment means attached to said member for engagement with abutment means on said other of said sleeves for displacing said other of said sleeves relative to said cylinder upon said member reaching said operative position.

29. The electrical switch of claim 21 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

30. The electrical switch of claim 22 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

31. The electrical switch of claim 23 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

32. The electrical switch of claim 24 wherein the other of said sleeves which is adjustably held in said cylinder comprises a plurality of parallel juxtaposed shallow V-grooves on its periphery and the means adjustably holding said other of said sleeves in said cylinder comprises a stationary ring having a plurality of flexible fingers each having a sharp tip engaged in one of said grooves for forming a ratchet-like connection allowing said other of said sleeves to be longitudinally displaced relative to said ring upon a force being applied at one end of said other of said sleeves.

* * * * *